United States Patent
Katayama et al.

(10) Patent No.: US 7,584,295 B2
(45) Date of Patent: Sep. 1, 2009

(54) DSL COMMUNICATION APPARATUS, AND DOWNLOAD METHOD OF DSL COMMUNICATION PROGRAM

(75) Inventors: Yumi Katayama, Saitama (JP); Nobuhiko Noma, Yokohama (JP)

(73) Assignee: Panasonic Corporation, Osaka (JP)

( * ) Notice: Subject to any disclaimer, the term of this patent is extended or adjusted under 35 U.S.C. 154(b) by 1482 days.

(21) Appl. No.: 10/409,194

(22) Filed: Apr. 9, 2003

(65) Prior Publication Data
US 2003/0233481 A1 Dec. 18, 2003

(30) Foreign Application Priority Data
Jun. 13, 2002 (JP) ............... 2002-172682

(51) Int. Cl.
*G06F 15/16* (2006.01)
(52) U.S. Cl. ............ 709/237; 709/203; 709/217; 710/104; 710/105; 370/278; 370/465
(58) Field of Classification Search ......... 709/203, 709/217, 237; 710/104, 105; 370/278, 465
See application file for complete search history.

(56) References Cited

U.S. PATENT DOCUMENTS

| 6,788,705 | B1 * | 9/2004 | Rango ............ 370/465 |
| 7,296,086 | B2 * | 11/2007 | Palm ............. 709/237 |
| 7,305,001 | B2 | 12/2007 | Noma et al. |

2002/0041572 A1 * 4/2002 Palm ............. 370/278

FOREIGN PATENT DOCUMENTS

| EP | 981222 | 2/2000 |
| JP | 2002 158735 | 5/2002 |
| WO | 02/077804 | 10/2002 |

OTHER PUBLICATIONS

A. Johansson, "ADSL Lite—The Broadband Enabler for the Mass Market", Ericsson Review, No. 4, Dec. 22, 1998, pp. 154-161.
Aware et al., "Splitterless G. Lite Interoperability with ANSI TI. 413 and/or G.DMT", Oct. 27, 1997.
Samsung AIT and Ikanos Communications, "Handshake and Initialization of the 8.265 kHz Tone Spacing Informative Annex for MCM VDSL", Feb. 23, 2001.
English language Abstract of JP 2002-158735.
"Handshake and Initialization of the 8.625 kHz Tone Spacing Informative Annex for MCM VDSL", by Samsung AIT and Ikanos Communications, Feb. 23, 2001 (XP-002203208).

* cited by examiner

*Primary Examiner*—Jinsong Hu
(74) *Attorney, Agent, or Firm*—Greenblum & Bernstein P.L.C.

(57) ABSTRACT

A host manages a ROM that stores a handshake program for executing a handshake sequence and an initialization program for executing an initialization sequence. During the handshake sequence, the handshake program is retrieved from the ROM to download the program to a non-resident memory of a program area. Upon completing the handshake sequence, the initialization program is retrieved from the ROM, to download the program to the non-resident memory, replacing the handshake program.

20 Claims, 11 Drawing Sheets

DSL COMMUNICATION APPARATUS, AND DOWNLOAD METHOD OF DSL COMMUNICATION PROGRAM

BACKGROUND OF THE INVENTION

1. Field of the Invention

The present invention relates to a DSL communication apparatus and a download method of a DSL communication program that are suitable for data transmission apparatus using a multi-carrier method, the method performing data transmission using a plurality of carriers having different frequencies.

2. Description of Related Art

The ADSL (Asymmetric Digital Subscriber Line) is a service that employs an existing telephone line so that both a high speed Internet connection service and ordinary telephone service can use the same line, which has rapidly become available in the recent years. For providing such ADSL services, ITU-T recommendations have been issued regarding ADSL modems. G.lite and G.dmt recommendations established in 1999 at ITU-T SG15 are ADSL standard recommendations, which further extend to ANNEX.A, ANNEX.B, ANNEX.C, and etc., for initialization establishing methods according to the communication environment of individual country (or region).

An ADSL communication apparatus has a resident memory (hereafter referred to as execution memory) in which a DSP within a transceiver executes a necessary program during ADSL communication.

During the ADSL communication, a handshake sequence is executed according to a protocol such as G.hs, in order to exchange capability information and manufacturer codes between ADSL communication apparatuses. For example, G.dmt is a protocol for ADSL communication that can transmit data at 1.5 Mbps, while G.lite is a protocol for ADSL communication that can transmit data at 8 Mbps. Both protocols have specifications such as ANNEX.A, ANNEX.B, and ANNEX.C, in order to accommodate communication environments in various counties and regions.

Capability information exchanged during the handshake sequence is checked to verify which protocol is supported by an opposing communication apparatus. ADSL communication becomes available when both communication apparatuses support the same protocol to be used.

According to the protocol determined during the handshake sequence (G.dmt or G.lite), an initialization sequence is executed to exchange various parameters to be used during the data transmission. When the initialization sequence is completed, data transmission (SHOWTIME) is initiated.

However, memory has not been used effectively when programs, in accordance with each protocol for handshake and initialization sequences, occupy the execution memory within the transceiver. In addition, when programs with large capacities occupy the execution memory, it becomes a burden for DSP to process, which slows down the processing speed. Especially, since ADSL communication performs a type of communication that is always connected, it is no necessary to repeat the sequences once the handshake and initialization sequences are performed, unless there is a communication error. Therefore, it is not necessary store the programs corresponding to different protocols for the handshake and initialization sequences after the connection is established. Further, as described above, the ADSL communication method employs G.dmt or G.lite method, each having specifications such as ANNEX.A, ANNEX.B, and ANNEX.C., which were difficult to be stored in the execution memory within the transceiver, because of the memory capacity limitation.

SUMMARY OF THE INVENTION

The present invention addresses the above-described problems. The purpose of this invention is to provide a DSL communication apparatus and a download method for a DSL communication program that limit programs to be stored in the execution memory within the transceiver, and only download, to a non-resident area of the execution memory, programs according to the necessary protocol in a given communication environment for execution.

According to the present invention, a handshake program that executes the handshake sequence, and an initialization program that executes the initialization sequence are stored in a memory managed by a host. During the handshake sequence, the handshake program is read from the memory, to be downloaded to the execution memory. Upon completing the handshake program, the initialization program is read from the memory, replacing the handshake program, to be downloaded to the execution memory.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

The embodiments of the present invention are explained in the following, in reference to the above-described drawings.

First Embodiment

Figure 1:
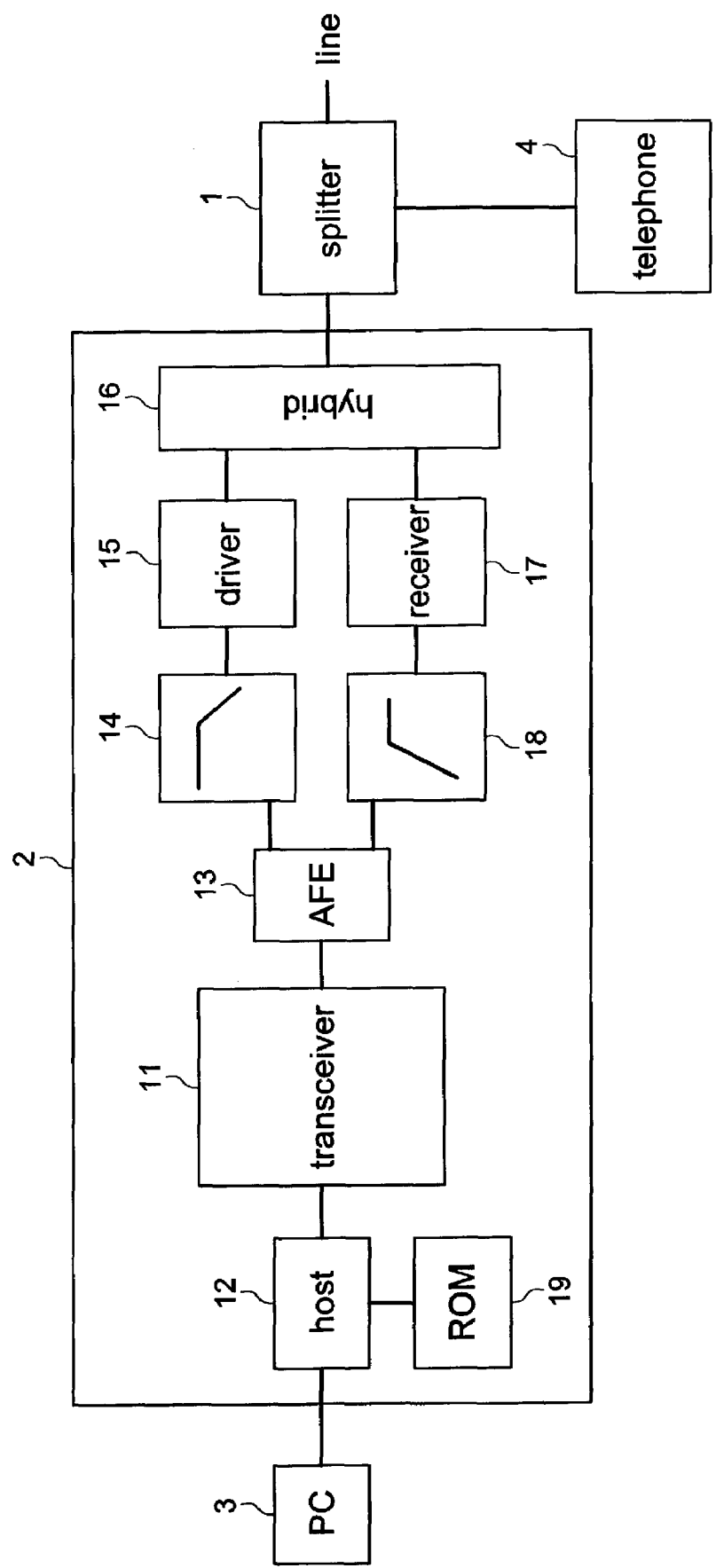
FIG. 1 illustrates a configuration of a communication system at an ATU-R side, according to a first embodiment of the present invention.

FIG. 1 illustrates a diagram of a communication system at the ATU-R side according to the present invention. In the communication system as illustrated in FIG. 1, a public phone line or a similar phone line (hereafter referred to as line) is connected to ADSL communication apparatus 2 via splitter 1. Further, user terminal 3 is connected to ADSL communication apparatus 2. When user terminal 3 and telephone 4 share one line, splitter 1 is necessary. However, when telephone 4 is not used, splitter 1 is not needed. It is also possible to have a configuration where user terminal 3 internally installs ADSL communication apparatus 2.

ADSL communication apparatus 2 includes transceiver 11 that executes handshake and initialization sequences and processes operations such as an error check after data transmission is initiated, and host 12 that controls the entire operation including the one of transceiver 11 and executes a download process (which will be later described). At the line side of transceiver 1, units are configured with an analog circuit via an analog front end (hereafter referred to as AFE) 13. Driver 15 is connected to a DA converter of AFE 13 via analog filter 14, so that analog signal amplified by driver 15 is transmitted to the line via hybrid 16. The analog signal transmitted from the line is received by receiver 17 via hybrid 16, and then is input into an AD converter of AFE 13 via analog filter 18. When sampling data is output from the AD converter, AFE 13 outputs the data to transceiver 11.

ROM 19 managed by host 12 stores programs to be downloaded to a program area of transceiver 11.

Figure 2:
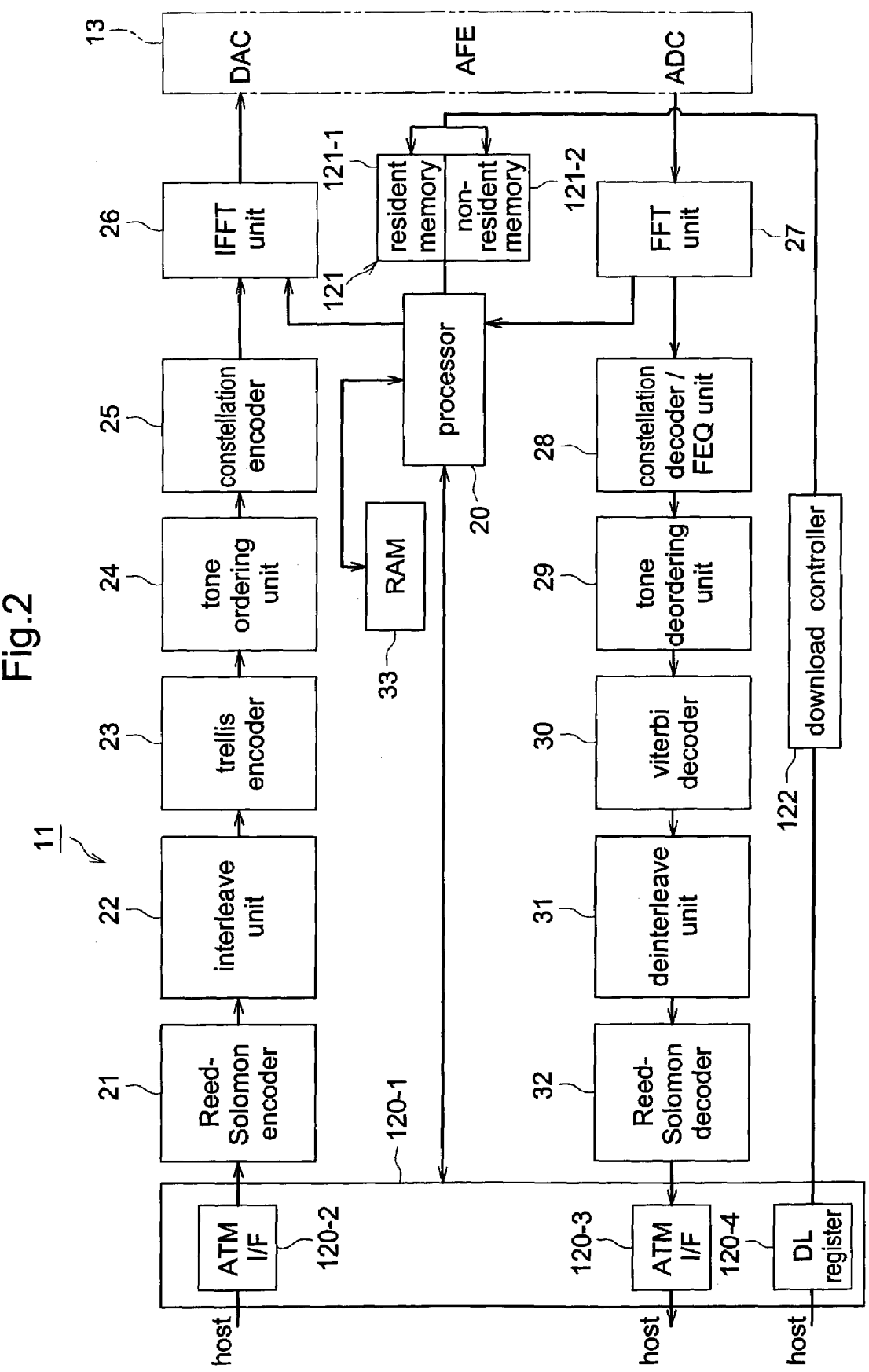
FIG. 2 is a functional block diagram illustrating a transceiver of FIG. 1.

FIG. 2 is a functional block diagram of transceiver 11. Transceiver 11 is connected to host 12 via host I/F 120-1. Host I/F 120-1 includes ATM I/F 120-2 that provides data from host 12 to a transmission process block, ATM I/F 120-3 that outputs data from a reception process block to host 12, and download register (DL register) 120-4 (which will be later described). This embodiment uses an I/F that complies with the ATM, since the transmission protocol at the host side uses the ATM in the current ADSL standard specification. However, this invention is not limited to the conversion to the ATM.

Processor 20 has a function to execute the handshake and initialization sequences prior to initiating data transmission (SHOWTIME), and a function to monitor errors and the like after the data transmission is initiated. Programs executed by processor 20 are stored in program area 121 configured by a RAM. Program area 121 includes resident memory 121-1 that stores resident programs, and non-resident memory 121-2 where necessary programs are appropriately downloaded from ROM 19. Download controller 122 controls the program downloads from ROM 19 to program area 121 under the management of host 12. Specifically, a program to be written into download register (HDLDT) 120-4 per word unit is read out so that each program is written to predetermined address within program area 121.

The transmission side of transceiver 11 includes Reed-Solomon encoder 21 that adds a redundancy bit for parity check, interleave unit 22 that sorts data, Trellis encoder 23 that performs data convolution from a Trellis encoding, tone ordering unit 24 that lays out a bit number for each carrier, constellation encoder 25 that converts a bit stream (of transmission data) into topology data on constellation coordinates (constellation data), and IFFT unit 26 that performs an Inverse Fast Fourier Transform (hereafter referred to as IFFT) on data after the constellation encoding process.

The reception process side of transceiver 11 includes FFT unit 27 that performs a Fast Fourier Transform (hereafter referred to as FFT) on sampling data of the received signal, constellation decoder/FEQ unit 28 that decodes data from constellation data of the FFT output signal and corrects a topology on the constellation coordinates, tone de-ordering unit 29 that restores data laid out to each carrier after tone ordering process at the transmission side, Viterbi decoder 30 that performs Viterbi decoding on the received data, de-interleave unit 31 that restores data being resorted by the transmission side, and Reed-Solomon decoder 32 that deletes the redundancy bit added by the transmission side. Transceiver 11 is connected to host 12 via host interface (I/F) 34. RAM 33 functions as a work area to be used when processor 20 executes an internal calculation.

Hereafter, the operations of this embodiment of the invention with the above-described configurations are illustrated in detail, with reference to figures.

Figure 3:
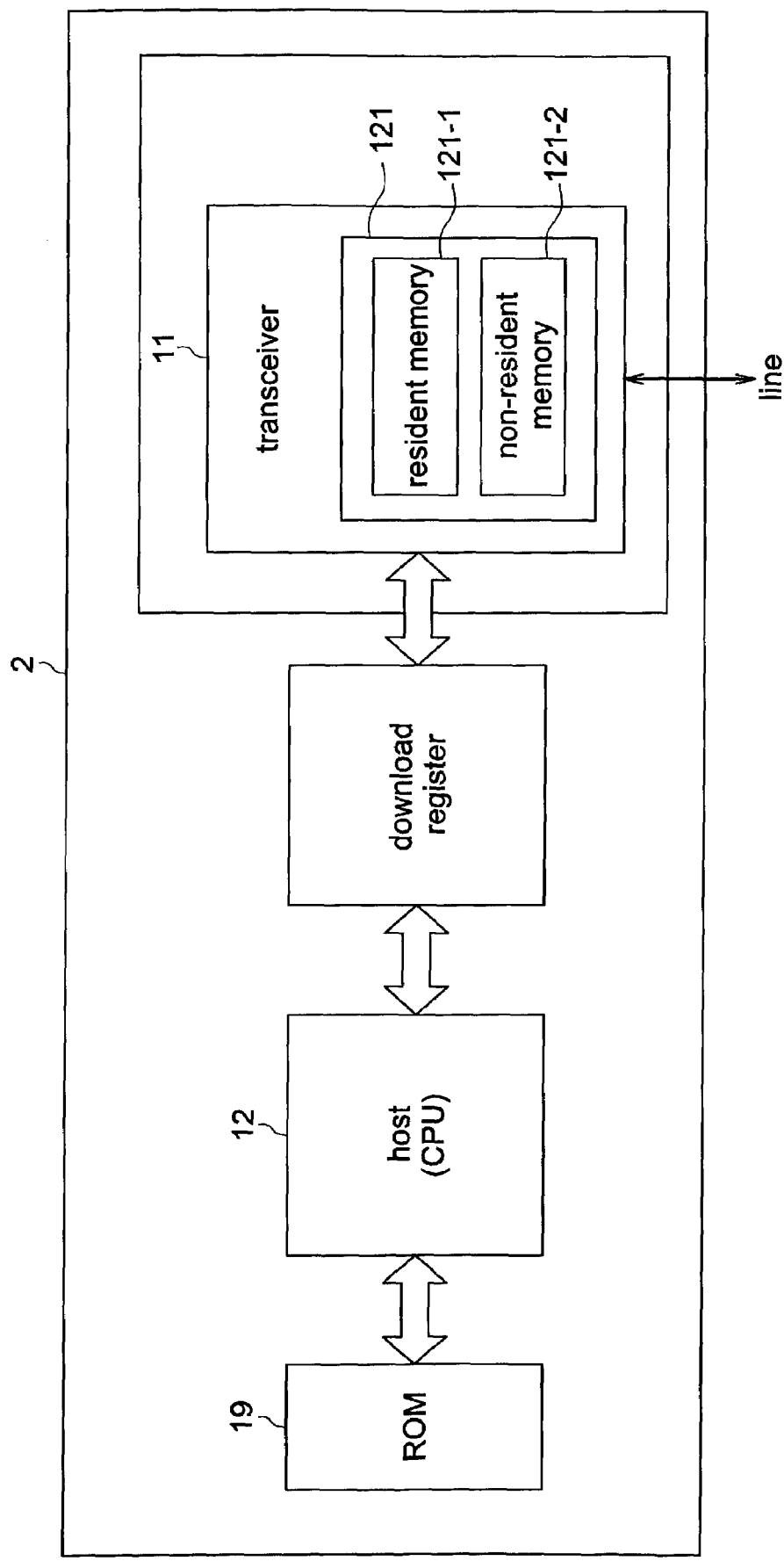
FIG. 3 is a conceptual illustration where a program is downloaded from a ROM to a program area.

FIG. 3 is a conceptual illustration when a program is downloaded from ROM 19 (outside of transceiver 11) to program area 121. As shown in FIG. 3, the download is performed when host 12 retrieves a program per one word from ROM 19 and writes into DL register 120-4, while download controller 122, upon receiving an instruction from host 12, writes the data (written in DL register 120-4) into non-resident memory or the like within program area 121.

The following illustrates a detailed operation of the program download.

Figure 4:
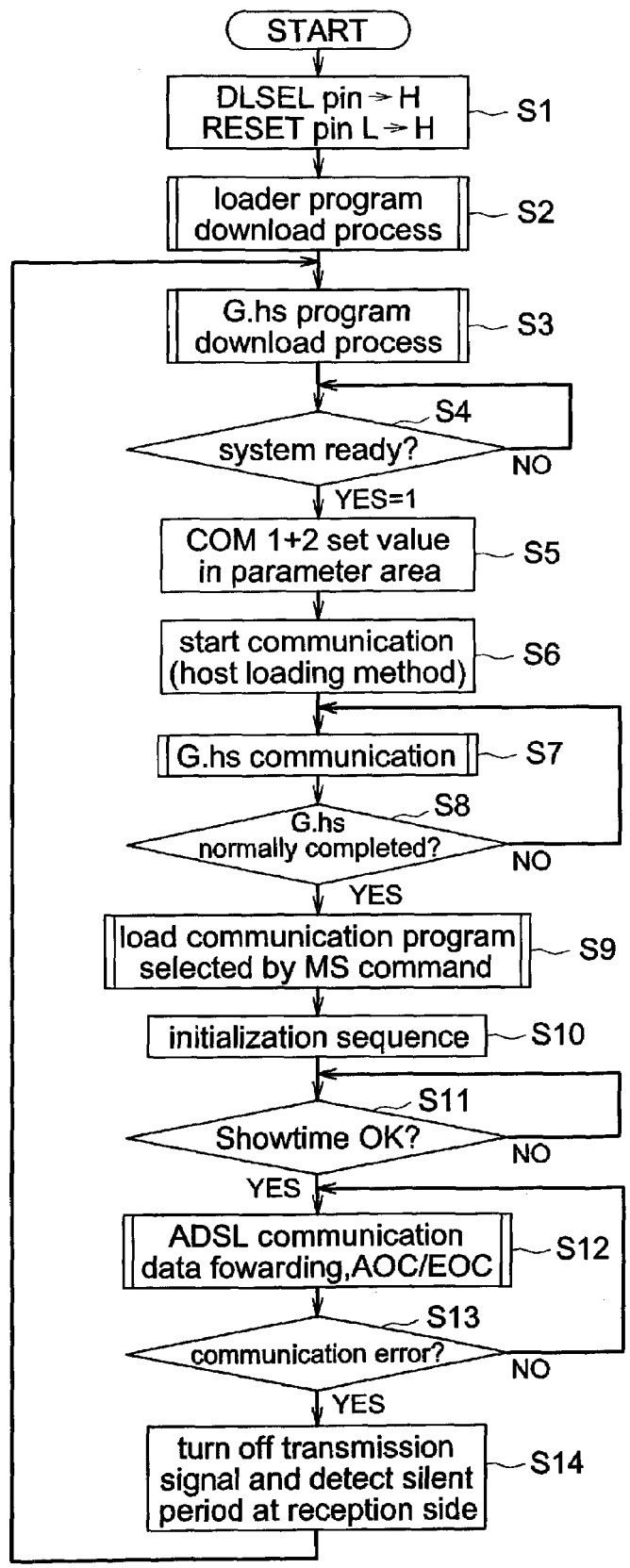
FIG. 4 is a flowchart illustrating a download process at an ADSL communication apparatus according to the first embodiment of the present invention.

FIG. 4 is a flowchart illustrating a series of processes relating to the program download. First, host 12 confirms that a program is to be downloaded (step S1), and first stores a loader program in resident memory 121-1 (step S2). The loader program is stored in resident memory 121-1, and the later-described non-resident program (program to execute G.hs, G.lite, etc.) is stored in non-resident memory 121-2 for downloading.

Figure 5:
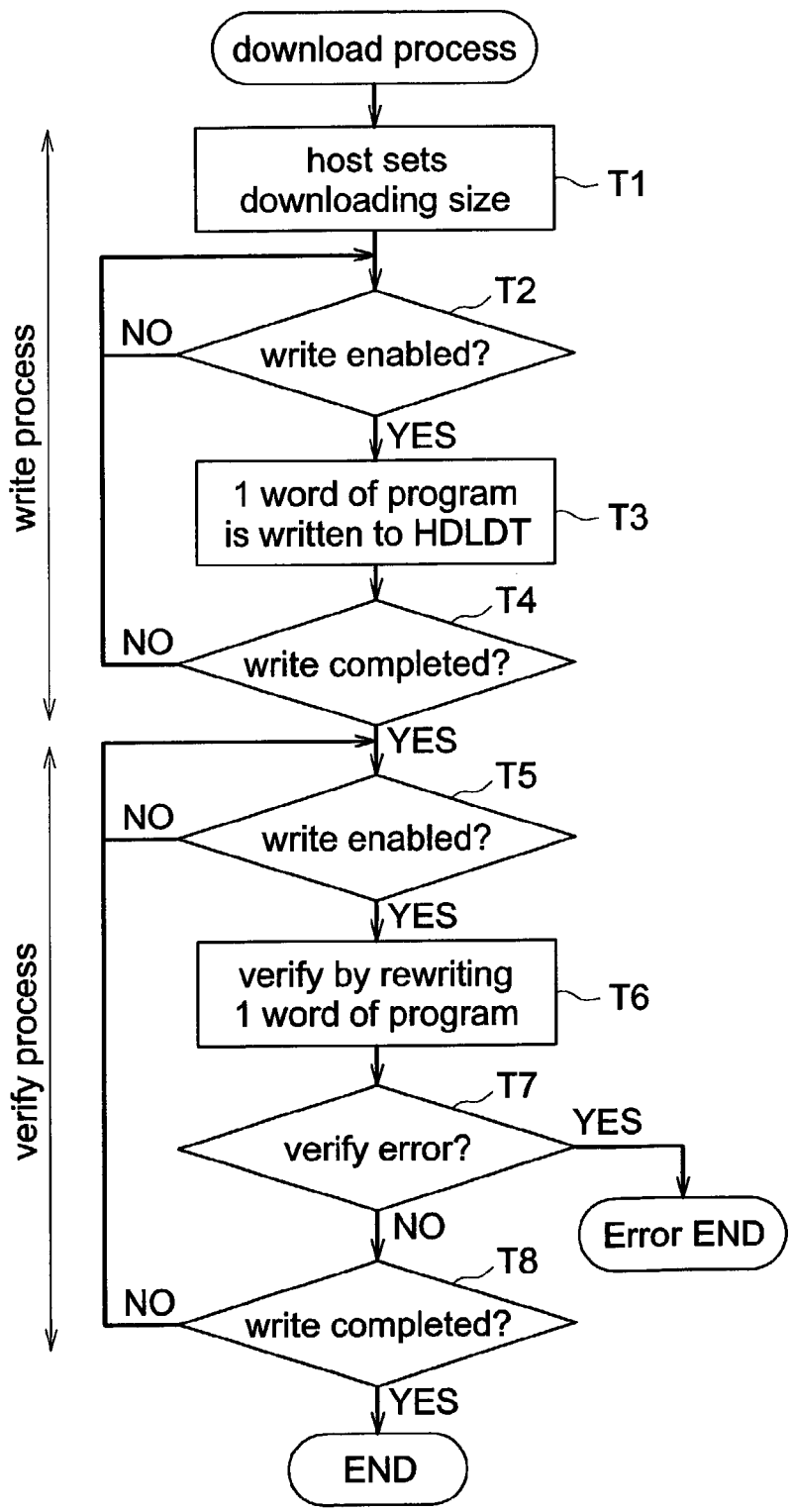
FIG. 5 is a flowchart illustrating a write process and a verify process executed during the download process according to the first embodiment of the present invention.

FIG. 5 is a flowchart illustrating operations of host 12 when a program is downloaded from ROM 19 (outside of transceiver 11) to program area 121 within transceiver 11. As shown in FIG. 5, the download process includes a pair of a write process and a verify process that verifies whether the written program data is correct. In particular, host 12 sets number of words by calculating the entire word number from the loader program size (step T1). When write is enabled (step T2), one word of the program data from the beginning of the program is written into download register 120-4 (step T3).

At transceiver 11 side, download controller 122 reads out the program data written into download register 120-4, and writes the data into resident memory 121-1.

Host 12 checks whether writing for the entire words is complete, every time one word is written (step T4), and completes the write process when writing for the entire word number is finished.

At transceiver 11 side, since download controller 122 sequentially reads out the program data written into download register 120-4 and then stores the data in resident memory 121-1, writing of the entire words of the loader program (in resident memory 121-1) is complete when host 12 completes the write process.

Upon completing the write process, host 12 moves to the verify process. When write is enabled (step T5), the program data of the loader program is re-written per word from ROM 19 to download register 120-4 (step T6).

Transceiver 11 compares a word of the loader program previously downloaded by download controller 122 and the currently written word in order to check whether they are identical. When the words are not identical, an error is generated.

Host 12 always checks whether an error is generated, every time one word is written into download register 120-4 (step T7). When the write process for the entire words is completed without having error (step T8), the verify process is completed.

As shown in FIG. 4, when the download to resident memory 121-1 of the loader program is completed, a process that downloads a G.hs program (stored in ROM 19) to non-resident memory 121-2 is started (step S3). The download process for this program includes the write and verify processes shown in FIG. 5.

When the system preparation is completed and the system is ready (step S4), the control moves to the next step. Then, values are set in COM1 register, COM2 register, and a parameter area (step S5). Normally, a communication command is set in COM1, and no data is set in COM2 in order to execute a normal communication. In the parameter area, support information for protocols such as G.lite and G.dmt, including individual information on ANNEX.A and ANNEX.C, is set. Parameters can include other original steps as long as they are related to capability information exchanged during the handshake sequence.

Upon downloading the program for G.hs to non-resident memory 121-2, host 12 instructs processor 20 to initiate the communication (step S6). Transceiver 11 executes the handshake sequence when processor 20 performs the G.hs program downloaded to non-resident memory 121-2 (step S7). During the handshake sequence, capability information is exchanged between the ATU-R and ATU-C in order to determine the protocol to be used during the initialization sequence and data transmission (SHOWTIME). For example, the ATU-R requests G.dmt, which is the first priority, using an MS (mode select) signal. When the ATU-C returns an ACK (acknowledgement), G.dmt can be selected.

When the handshake sequence is normally completed, and the protocol to be used during the initialization sequence and data transmission (SHOWTIME) is determined (step S8), host 12 is notified. Then, under the management by host 12, the program for the protocol to be used (determined by the handshake) is downloaded from ROM 19 to non-resident memory 121-2 (step S9). In this explanation, G.dmt is determined to be a protocol for the use.

Since the G.hs program is stored in non-resident memory 121-2 at step S3, the G.hs program is deleted before downloading the G.dmt program.

Figure 6:
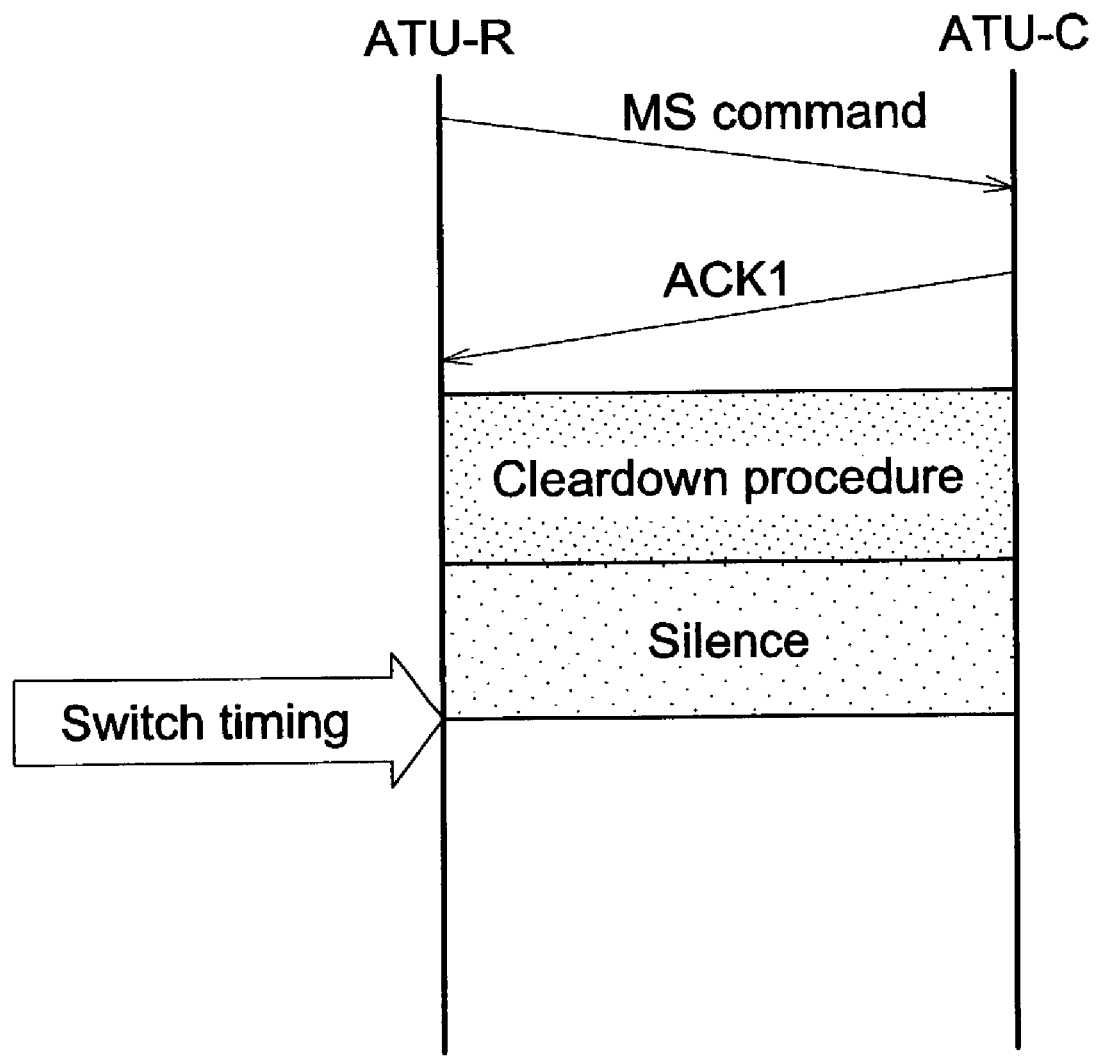
FIG. 6 illustrates switch timing from G.hs to G.dmt (G.lite)
Figure 7:
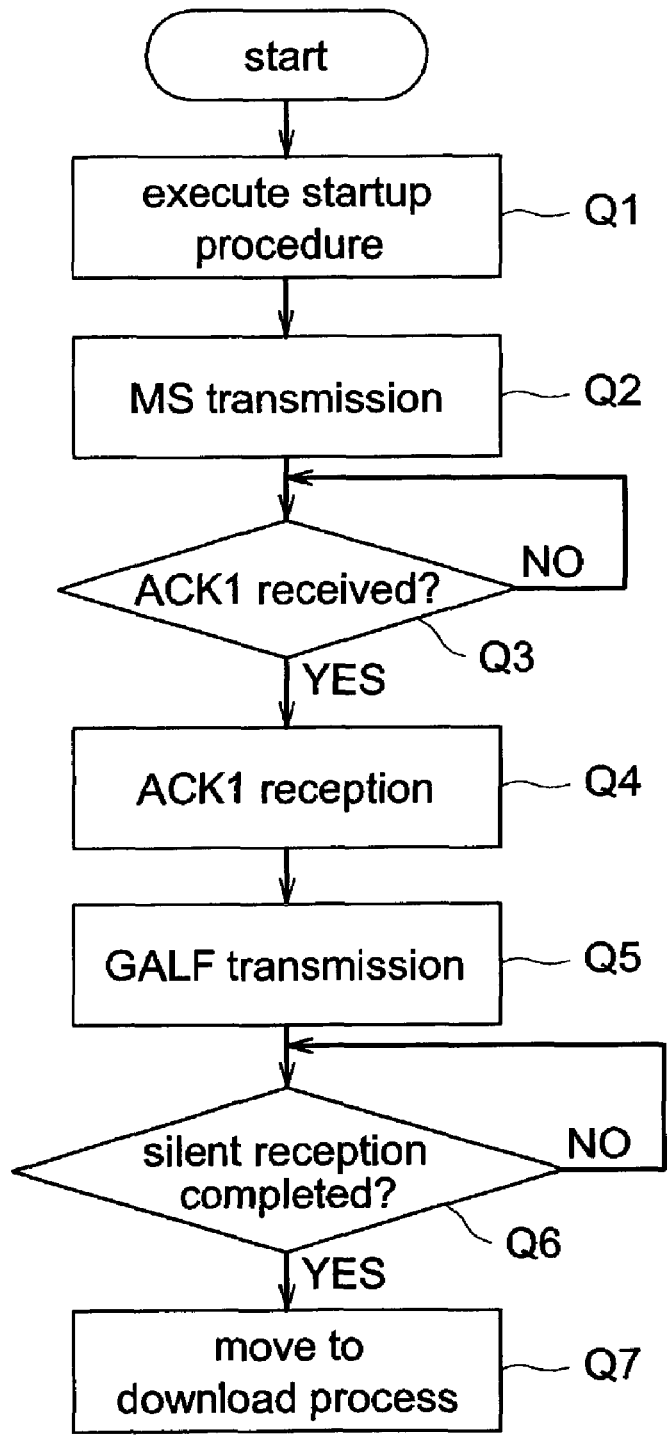
FIG. 7 is a flowchart determining a communication protocol by transmitting an MS signal during a handshake sequence.
Figure 8:
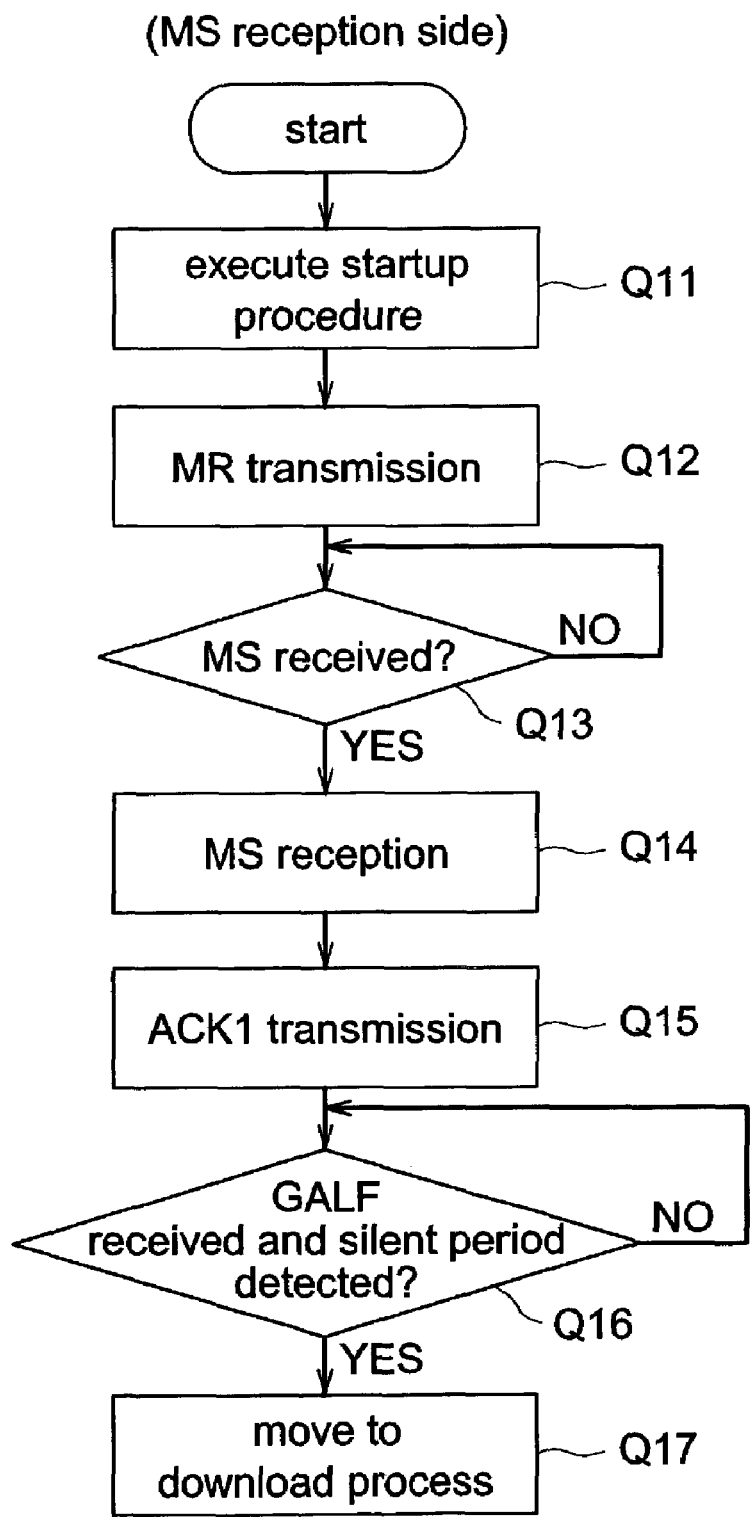
FIG. 8 is a flowchart determining a communication protocol by receiving an MR signal during a handshake sequence.

FIG. 6 illustrates switch timing within non-resident memory 121-2, from the G.hs program to the G.dmt program. FIG. 7 is a flowchart illustrating only the process that is related to the MS signal. When the handshake sequence is executed (step Q1), the ATU-R transmits the MS signal requesting G.dmt, for example, to the ATU-C (step Q2). When the ATU-C acknowledges the G.dmt transmission, the ATU-C responds by transmitting ACK1. The ATU-R waits for the reception of ACK1 (step Q3). Upon receiving ACK1 (step Q4), a GALF signal is transmitted (step Q5) in order to perform a confirmation process in response to ACK1 (step Q6). After a predetermined time of silent period, the G.dmt program is downloaded (step Q7). The download process of the G.dmt program follows the above-described flowchart of FIG. 5.

In addition, in the flowchart illustrated in FIG. 7, the ATU-R transmits an MS signal that specifies a desired protocol, to the ATU-C. However, the present invention is not limited to the above method. For example, this invention accommodates a method where the ATU-C requests the desired protocol to the ATU-R. In particular, when the handshake sequence is initiated (step Q11), the ATU-R transmits, to ATU-C, an MR (mode request) signal requesting a transmission of a protocol that the ATU-C desires (step Q12). When the ATU-C desires G.dmt transmission, the ATU-C returns an MS signal setting G.dmt. The ATU-R waits for the MS signal reception (step Q13). Upon receiving the MS signal (step Q14), the ATU-R compares capability information. When the ATU-R supports the given protocol, the ATU-R responds by transmitting ACK1 (step Q15). When a GALF signal from the ATU-C is received and when a predetermined time period passes since the GALF reception (step Q16), the G.dmt program is downloaded (step Q17).

When the G.dmt program is downloaded to non-resident memory 121-2, processor 20 executes the program to perform the initialization sequence (step S10). When various communication parameters including the communication speed are determined during the initialization sequence, the completion of the last process of the initialization sequence is confirmed (step S11), in order to initiate the ADSL data transmission (SHOWTIME) (step S12).

When there is an error during the data transmission (step S13), the transmission signal is stopped and a silent period at the reception side is detected (step S14). Then the control moves back to step S3 in order to re-download the G.hs program to non-resident memory 121-2, which restarts the handshake sequence.

Figure 9:
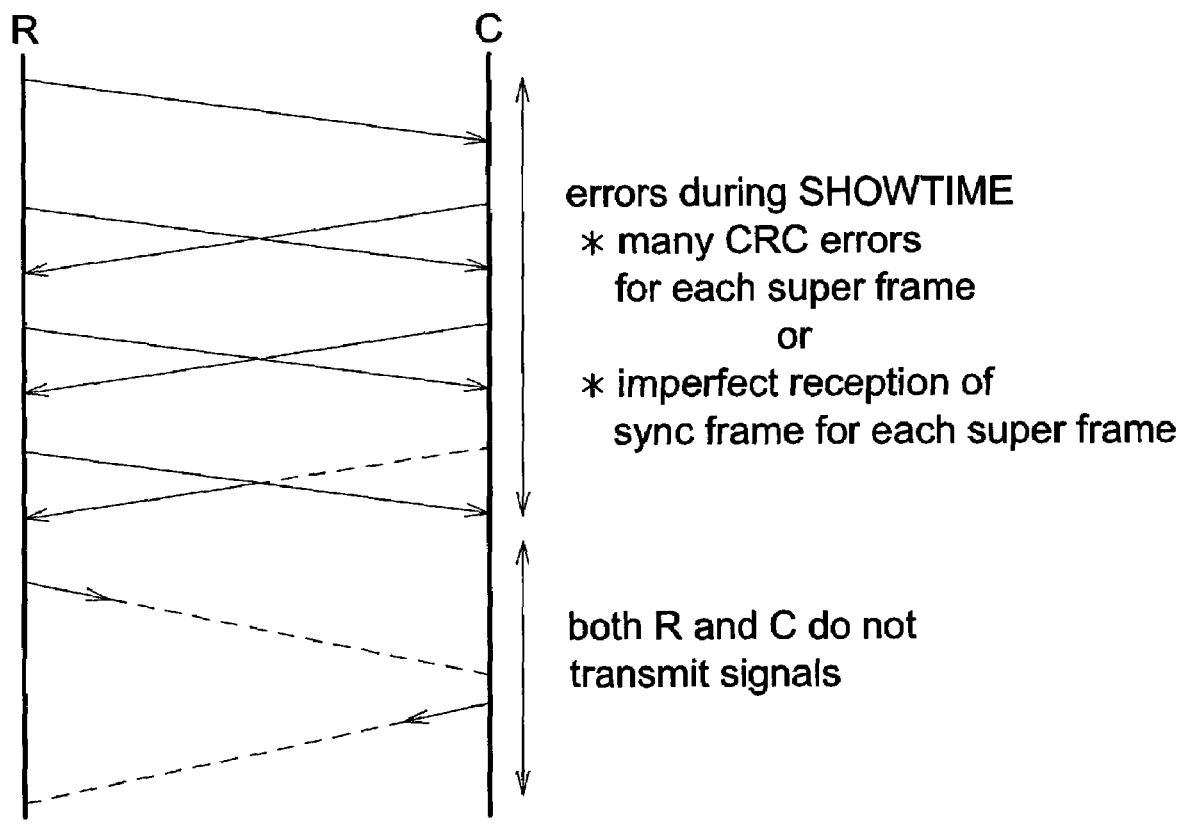
FIG. 9 illustrates switch timing from G.dmt (G.lite) to G.hs.

FIG. 9 illustrates switch timing for the program in the non-resident memory 121-2, from G.dmt to G.hs. As shown in FIG. 9, when there are many CRC errors and/or imperfect receptions of sync frames during the data transmission (SHOWTIME), the transmission signal is stopped before the switching operation from G.dmt to G.hs.

Figure 10:
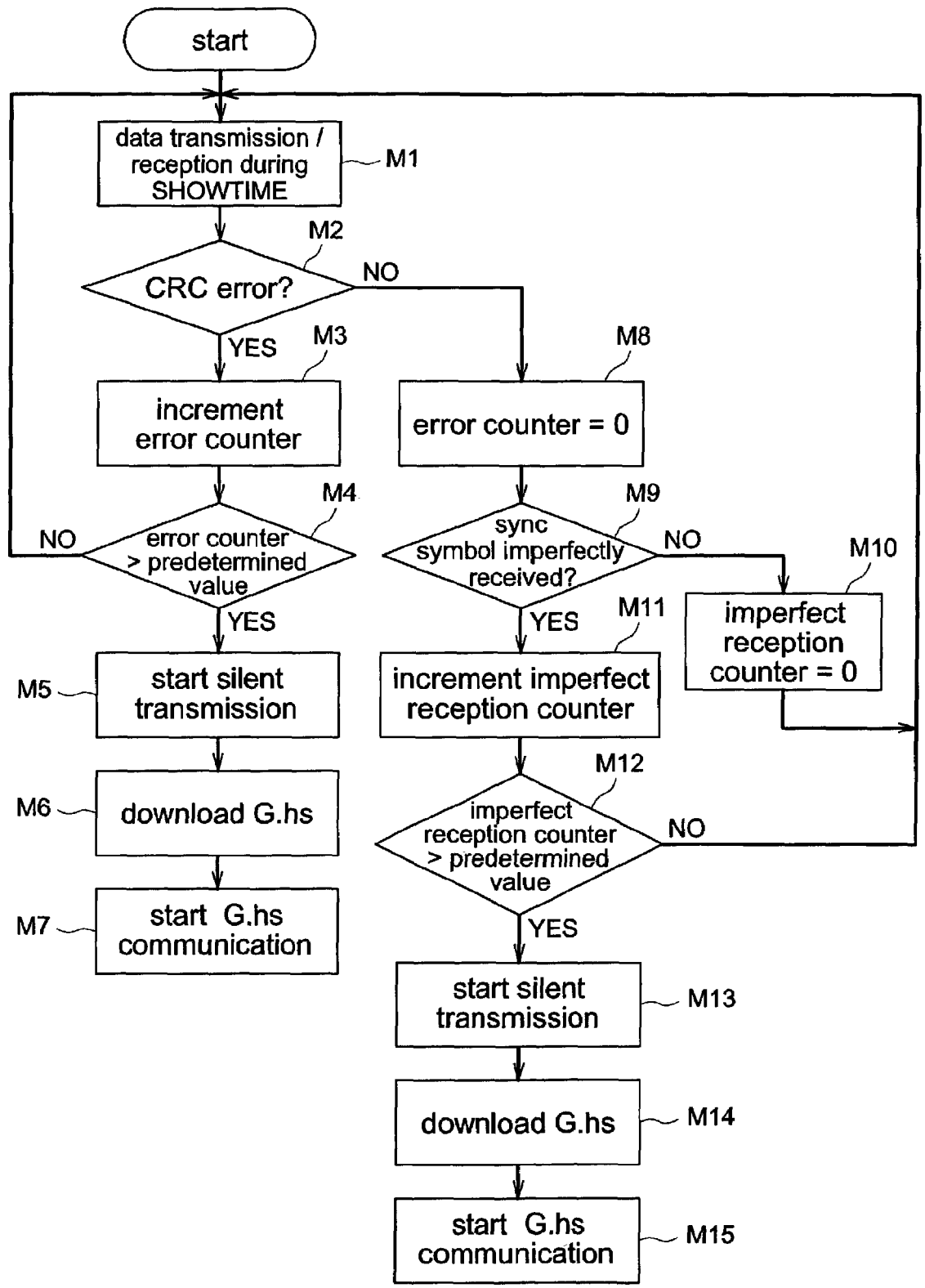
FIG. 10 is a flowchart illustrating a switching operation from G.dmt (G.lite) to G.hs.

FIG. 10 is a flowchart illustrating the switching operation from G.dmt to G.hs, when there is an error during the data transmission. During the data transmission (SHOWTIME), a CRC check is performed per frame unit in order to test the data reliability. At the same time, a sync symbol (generated from known data) is periodically transmitted. Therefore, when the data transmission (SHOWTIME) is initiated (step M1), the CRC check is performed per frame unit. When there is a CRC error (step M2), an error counter is incremented (step M3), and whether the error counter value exceeds a predetermined value is checked (step M4). When the error counter value exceeds the predetermined value, there is a pause for a predetermined period of silent transmission (silent period) (steps M5 and S14). Then, the G.hs program is downloaded to non-resident memory 121-2 (steps M6 and S3) in order to execute the handshake sequence in accordance with G.hs, as previously described (steps M7 and S7).

When it is determined that there is no CRC error during step M2, the error counter is reset (step M8), and it is checked whether there is a imperfect reception of a sync symbol (step M9). When the sync symbol is normally received, an imperfect reception counter is reset. Then, the control moves back to step M1 (step M10).

When an imperfect reception of the sync symbol is found during step M9, the imperfect reception counter is incremented (step M11). Then, it is checked whether the imperfect reception counter value exceeds a predetermined value (step M12). When the counter value does not exceed the predetermined value, the control moves back to step M1. However, when the counter value exceeds the predetermined value, there is a pause for a predetermined period of silent transmission (silent period) (steps M13 and S14). Then, the G.hs program is downloaded to non-resident memory 121-2 (steps M14 and S3) in order to execute the handshake sequence in accordance with G.hs, as previously described (steps M15 and S7).

Second Embodiment

In the second embodiment of the present invention, the program is not downloaded from ROM 19 that is permanently installed to ADSL communication apparatus 2. Instead, a program stored in a recording media (such as FROM) is downloaded from outside of ADSL communication apparatus 2 to program area 121.

In the second embodiment, the basic communication system configuration is the same as the one shown in FIG. 1. Therefore, only different configurations related to download procedure are hereafter illustrated.

Figure 11:
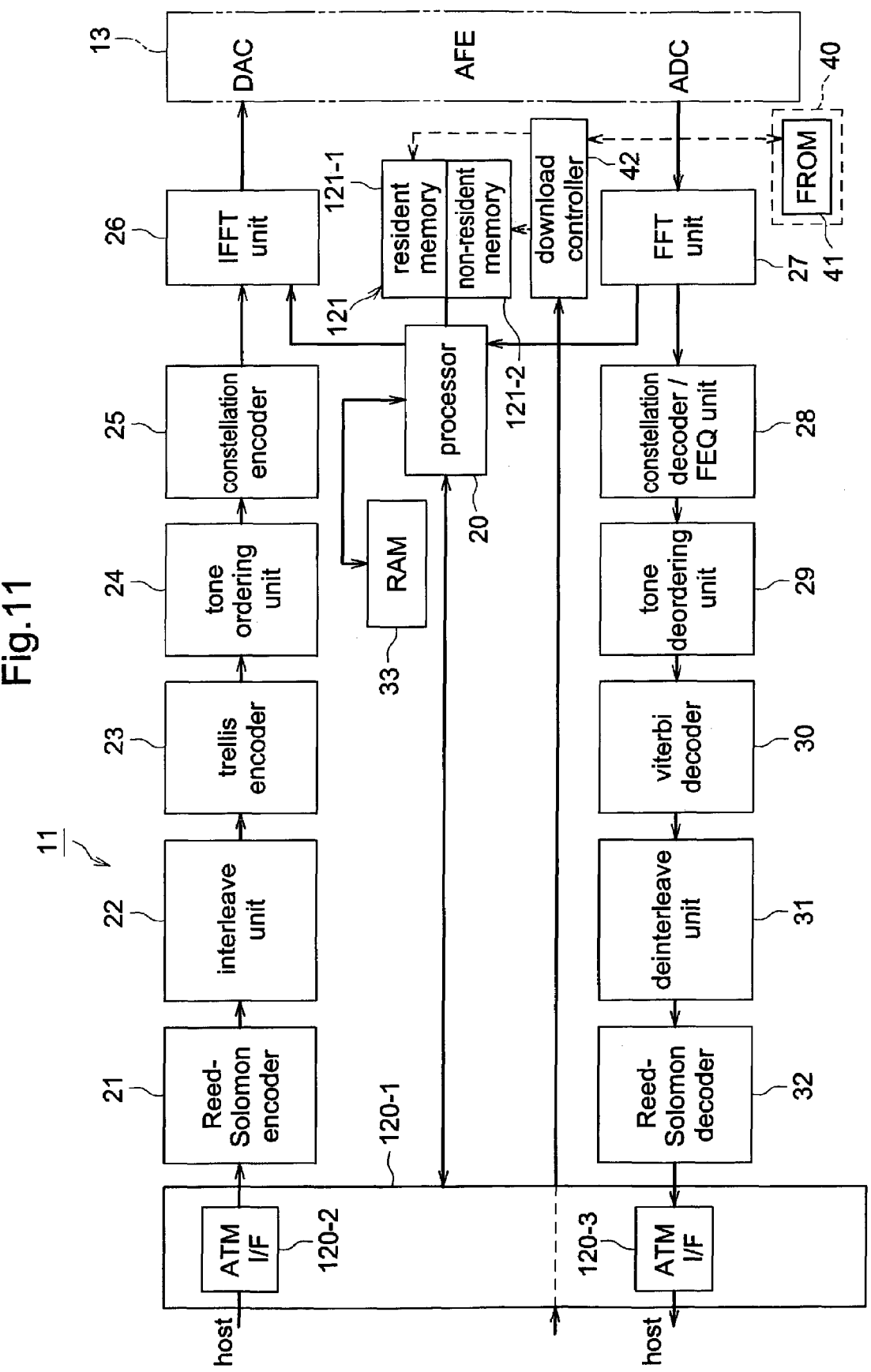
FIG. 11 is a functional block diagram of a transceiver used in a communication system according to the second embodiment of the present invention.

FIG. 11 is a functional block diagram illustrating a transceiver. Functions having same numeral characters as in FIG. 2 represent the same functions as in FIG. 2. In the second embodiment, ADSL communication apparatus 2 installs a recording media through slot 40 that electrically connects the recording media with a bus of transceiver 11. Thus, recording media (FROM) 41 that stores programs is attached through slot 40. Upon receiving an instruction from host 12, download controller 42 executes a program that directly writes a predetermined program into resident memory 121-1 or non-resident memory 121-2 within program area 121. Host 12 instructs download controller 42 for the timing of specifying a desired program to download or the timing of downloading the program from FROM 41 to program area 121, so that the similar programs are downloaded with the similar timing as in the flowchart of FIG. 4.

In the above illustration, an ADSL communication apparatus is used. However, the invention can also be applied to other DSL communications that are not ADSL.

Further, the above illustration used the example of the ATU-R side, however, the download system can be installed to the ATU-C side in order to achieve the same effects.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above-described embodiments, and various variations and modifications may be possible without departing from the scope of the present invention.

This application is based on the Japanese Patent Application No. 2002-172682 filed on Jun. 13, 2002, entire content of which is expressly incorporated by reference herein.

What is claimed is:

1. A Digital Subscriber Line (DSL) communication apparatus comprising:
    a memory unit that stores a handshake program for executing a handshake sequence and an initialization program for executing an initialization sequence;
    an execution memory that stores the programs upon execution, the programs being stored in said memory unit; and
    a controller that downloads the handshake program from said memory unit to said execution memory during the handshake sequence, and downloads the initialization program from said memory unit to said execution memory upon completing the handshake sequence, replacing the handshake program.

2. The DSL communication apparatus according to claim 1, wherein the initialization program stored in said memory unit comprises two programs, the programs being G.dmt and G.lite that are Asymmetric Digital Subscriber Line (ADSL) communication protocols set by the International Telecommunication Union-Telephone (ITU-T), one of the programs being selected based on a result of the handshake sequence, to be downloaded to said execution memory.

3. The DSL communication apparatus according to claim 1, wherein the initialization program stored in said memory unit comprises two protocols, the protocols being ANNEX.A and ANNEX.C that are Asymmetric Digital Subscriber Line (ADSL) communication protocols set by the International Telecommunication Union-Telephone (ITU-T), one of the protocols being selected to be downloaded to said execution memory.

4. The DSL communication apparatus according to claim 1, wherein, during the handshake sequence, a mode select signal indicating a desired Asymmetric Digital Subscriber Line (ADSL) communication protocol is transmitted to an opposing communication apparatus, and, upon receiving an approval signal from the opposing communication apparatus, the desired ADSL communication protocol is downloaded from said memory unit to said execution memory.

5. The DSL communication apparatus according to claim 4, wherein, a GALF signal is transmitted to the opposing communication apparatus upon receiving the approval signal from the opposing communication apparatus, and a program download is initiated after a predetermined silent time period.

6. The DSL communication apparatus according to claim 1, wherein, during the handshake sequence, a mode request signal indicating an Asymmetrical Digital Subscriber Line (ADSL) communication protocol requested by the opposing communication apparatus is transmitted to an opposing communication apparatus, and, upon receiving a mode select signal indicating the ADSL communication protocol from the opposing communication apparatus, the ADSL communication protocol is selected in order to download a corresponding program from said memory unit to said execution memory, as much as possible.

7. The DSL communication apparatus according to claim 6, wherein, when the program of the ADSL communication protocol to be downloaded to said execution memory is determined, downloading of the program starts after a predetermined silent time period, upon receiving the GALF signal from the opposing communication apparatus.

8. The DSL communication apparatus according to claim 1, wherein said memory unit is a Read-Only memory (ROM) managed by a host.

9. The DSL communication apparatus according to claim 8, wherein the host retrieves a program stored in said memory unit per one word and forwards the program to said execution memory.

10. The DSL communication apparatus according to claim 1, wherein said memory unit is a flash memory installed to the apparatus.

11. The DSL communication apparatus according to claim 1, said controller being configured to delete the handshake program from the execution memory prior to downloading the initialization program to the execution memory.

12. The DSL communication apparatus according to claim 1, wherein, during the handshake sequence, information is transmitted to determine the protocol to be utilized during the initialization sequence and, during the initialization sequence, based on the protocol determined during the handshake sequence, the protocol to be used during the initialization sequence is downloaded to the execution memory from the memory unit.

13. A Digital Subscriber Line (DSL) communication transceiver comprising:
- a processor that executes a handshake sequence and an initialization sequence;
- a non-resident memory that stores programs of the handshake sequence and the initialization sequence executed by said processor;
- a host interface (I/F) that communicates with a host;
- a download register to which a program to be stored in said non-resident memory is written per one word; and
- a download controller that writes program data per one word into said non-resident memory, the program data being written in said download register, wherein, during the handshake sequence, program data of the handshake sequence is written to said download register, and,
- when said processor notifies the host of a completion of the handshake sequence, program data of the initialization sequence is written to said download register, by replacing the program of the handshake sequence with the program of the initialization sequence within said non-resident memory.

14. The DSL communication transceiver according to claim 13, wherein, during the handshake sequence, information is transmitted to determine the protocol to be utilized during the initialization sequence.

15. The DSL communication transceiver according to claim 13, wherein the processor is configured to delete the handshake sequence from the non-resident memory prior to writing the program data of the initialization sequence to the non-resident memory.

16. A Digital Subscriber Line (DSL) communication transceiver comprising: a processor that executes a handshake sequence and an initialization sequence; a non-resident memory that stores programs of the handshake sequence and the initialization sequence executed by said processor;
- a host interface (I/F) that communicates with a host;
- a slot to which a recording media is installed; and
- a download controller that directly writes a program to said non-resident memory, the program being stored in the recording media installed to said slot, wherein, during the handshake sequence, program data of the handshake sequence is written from the recording media to said non-resident memory, when said download controller receives an instruction from the host, and, when said processor notifies the host of a completion of the handshake sequence, program data of the initialization sequence is written from the recording media to said non-resident memory, when said download controller receives an instruction from the host, by replacing the program of the handshake sequence with the program of the initialization sequence within said non-resident memory.

17. The DSL communication transceiver according to claim 16, wherein the processor is configured to delete the handshake sequence from the non-resident memory prior to writing the program data of the initialization sequence to the non-resident memory.

18. A download method of a Digital Subscriber Line (DSL) communication program comprising:
- retrieving a program of a handshake sequence from a memory unit upon executing the handshake sequence;
- downloading the program to an execution memory of a processor that executes the handshake sequence;
- deleting the program of the handshake sequence from the execution memory, upon completing the handshake sequence; and
- downloading a program of an initialization sequence to the execution memory by retrieving the program of the initialization sequence from the memory unit.

19. The download method of a DSL communication program according to claim 18, wherein, the memory unit stores initialization programs that comprise at least two programs, including G.dmt and G.lite that are Asymmetric Digital Subscriber Line (ADSL) communication protocols set by the International Telecommunication Union-Telephone (ITU-T) as initialization programs, one of the programs being selected based on a result of the handshake sequence, to be downloaded to the execution memory.

20. The download method of a DSL communication program according to claim 18, further comprising:
- transmitting, during the handshake sequence, information to determine a program to be utilized during the initialization sequence.

* * * * *

UNITED STATES PATENT AND TRADEMARK OFFICE
CERTIFICATE OF CORRECTION

| | | |
|---|---|---|
| PATENT NO. | : 7,584,295 B2 | Page 1 of 1 |
| APPLICATION NO. | : 10/409194 | |
| DATED | : September 1, 2009 | |
| INVENTOR(S) | : Yumi Katayama et al. | |

It is certified that error appears in the above-identified patent and that said Letters Patent is hereby corrected as shown below:

On the title page, at Item (73), Assignee, "Panasonic Corporation, Osaka (JP)" should be
-- Panasonic Communications Co., Ltd., Fukuoka (JP) --

Signed and Sealed this

Thirtieth Day of March, 2010

David J. Kappos
*Director of the United States Patent and Trademark Office*